United States Patent [19]

Ueda

[11] Patent Number: 4,678,567

[45] Date of Patent: Jul. 7, 1987

[54] ACTIVATED SLUDGE PROCESS BED

[75] Inventor: Iwao Ueda, Kyoto, Japan

[73] Assignees: Iwao Ueda; Chie Ueda, both of Kyoto, Japan

[21] Appl. No.: 886,922

[22] Filed: Jul. 18, 1986

[30] Foreign Application Priority Data

Jul. 24, 1985 [JP] Japan .................. 60-114458[U]

[51] Int. Cl.$^4$ ............................................ C02F 3/06
[52] U.S. Cl. ...................................... 210/150; 210/615
[58] Field of Search ............................ 210/615–618, 210/150, 151, 508, 620, 195.1, 497.1, 497.01, 494.1, 494.2, 199–202

[56] References Cited

U.S. PATENT DOCUMENTS 3,577,678  5/1971  Burton ........................... 210/615
4,181,604  1/1980  Onishi et al. ..................... 210/150

FOREIGN PATENT DOCUMENTS 54-71085   6/1979  Japan .............................. 210/497.1
55-132689  10/1980 Japan .............................. 210/615
59-145096  8/1984  Japan .
1363416    8/1974  United Kingdom ................ 210/150
186895    10/1966  U.S.S.R. ............................ 210/150
1066628    1/1984  U.S.S.R. ............................ 210/499

Primary Examiner—Benoit Castel
Attorney, Agent, or Firm—Lowe Price LeBlanc Becker & Shur

[57] ABSTRACT

An activated sludge process bed in which an outer periphery of a cylindrical core is wrapped with a porous member of a certain thickness and tightened with belts, characterized in that the outer periphery is partially exposed.

2 Claims, 5 Drawing Figures

FIG. 2
FIG. 3
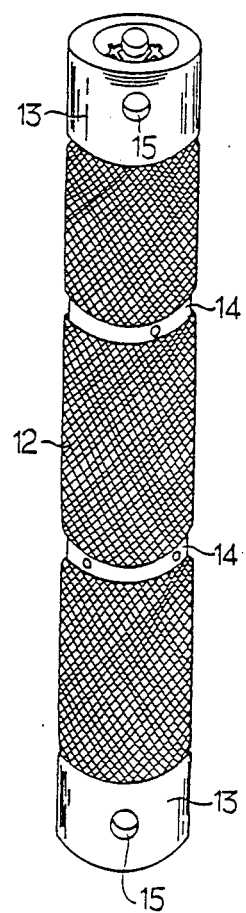
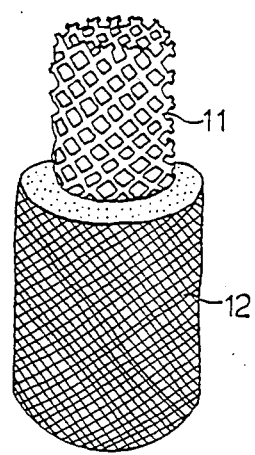

ACTIVATED SLUDGE PROCESS BED

BACKGROUND OF THE INVENTION

1. Field of the Invention

The present invention relates to an activated sludge process bed for use in sewage treatement, in which water pollution materials such as BOD, COD contained in sewage water like industrial effluent, sewage water discharged from home, etc. are oxidatively decomposed and eliminated by micro-organisms (i.e., activated sludge) cultivated and bred on a carrier (i.e., cultivation bed).

2. Description of Prior Arts

Hitherto, a catalytic oxidation method is known as one of conventional sewage treatment methods in which water pollution materials such as BOD, COD contained in the sewage water discharged from factories, hotels, homes and the like are decomposed by micro-organisms. According to this known method, micro-organisms are implanted, cultivated and bred on a surface of a catalytic element of a certain design, and the catalytic element is arranged in an aerator to decompose BOD, etc. contained in sewage water.

In such conventional catalytic oxidation method using a catalytic element, however, there exist such problems that aeration control is difficult and that micro-organisms may sometimes excessively increase to the extent of clogging up a treatment equipment paralyzing the decomposition of BOD, etc.

In another catalytic oxidation method, in which a corrugated plate of a hard synthetic resin is used as a catalytic element, there exists such problems that it takes long for aerobic bacteria to be implanted and cultivated, that a film formed by bacteria is easy to be peeled due to water flow at the time of aeration or by some physical shock, and that some pieces of the peeled film come to float as scum while the other being precipitated into the bottom of a treatment tank as sludge declining sewage treatment performance thereby.

In a further method for sewage treatment in which a sponge piece is used as a catalytic element floating in an aeration tank, there exists a problem that the sponge piece tends to move to one corner of the tank due to water flow at the time of aeration or by wind, eventually inhibiting uniform treatment.

In view of the foregoing problems pertaining to the catalytic oxidation method, the applicant has proposed an activated sludge process bed as disclosed in Japanese laid open Patent Publication (unexamined) No. 59-145096. According to this prior activated sludge process bed, of which perspective view is shown in FIG. 2 and a partially enlarged view in FIG. 3, a mesh-like or grid-like outer peripheral surface of a cylindrical core 11 is wrapped with a porous member 12 at a specified thickness, e.g., 15 to 20 mm, said core 11 being composed of a hard synthetic resin resistant to corrosion over a long period of immersion in sewage water, both upper and lower part thereof being tightened with tightening rings 13, several parts of the cylindrical body being further tightened with tightening belts 14 so that the porous member 12 is tightly fastened to the cylindrical core 11. In these drawings, a reference numeral 15 is holes perforated on each tightening ring 13 to insert supporting rods for supporting the bed therethrough. In place of such holes, it is also preferred to attach supporting wires on the upper and lower end portions of the rings 13. The porous member 12 is formed of a lot of corrosion resistant vinylidene chloride yarns intertwisted one another or of other spongy, mesh-like or fibrous synthetic resin. Then a plurality of activated sludge process beds are vertically disposed in an aeration tank.

According to such prior activated sludge bed, following advantages are attained. That is, there is no possibility that the activated sludge process beds are moved by bubbles blown out of an aeration pipe, micro-organisms can be implanted and cultivated in rather short period, and the film of micro-organisms is not peeled at all. Furthermore, aerobic bacteria and anaerobic bacteria decompose BOD, COD, etc. further breeding themselves, while other giant micro-organisms are spontaneously bred or come to live at the center portion of the porous member and eat away these aerobic and anaerobic bacteria and autolize them. As a result, it is possible to prevent excessive increase of the aerobic bacteria so as not to produce further sludges. When a plurality of tanks are installed in a row and dissolved oxygen concentration (hereinafter referred to as "DO value") by the aeration is changed tank by tank as well as depending on whether inner periphery or outer periphery of the cylindrical activated sludge process bed, it is expected to perform the sewage treatment efficiently at a high BOD/COD elimination rate by means of respective beds, each having adequate breeding layers formed of aerobic and anaerobic bacterias while balancing nutritively the air, nitrogen and phosphorus they need according to the progress of the treatment.

The sewage treatment method disclosed in the above Publication No. 59-145096 has certainly various advantages as described above, but at the same time following disadvantages are to be pointed out. That is, as a matter of fact, from the viewpoint of operation control, it is quite difficult to control aerobic and anaerobic bacteria accurately so as to keep a correct and desired DO value tank by tank as well as inside and outside of each tank by merely changing the amount of air supplied from the aeration pipe since such other factor as water flow gives influence to the control. Besides, daily operation control in the treatment will require much labor. Accordingly, since the accurate control of DO value is difficult, it will be further difficult to eliminate BOD and COD at high efficiency. In particular, when BOD and/or COD is at lower level, the treatment will be difficult all the more.

SUMMARY OF THE INVENTION

Accordingly, an object of the present invention is to provide an improved activated sludge process bed in which an outer periphery of an elongated cylindrical core is not completely coated with a porous member but partially exposed to insure communication between inside and outside of the activated sludge process bed. Thus, in accordance with the present invention, there is provided an activated sludge process bed in which a mesh-like or grid-like outer periphery of a cylindrical core is wrapped with a porous member of a certain thickness and further tightened by tightening means, characterized in that the outer periphery of the cylindrical core is partially exposed in a specified form. Area and configuration of the exposed portions of the outer periphery of the cylindrical core in the activated sludge bed are appropriately varied tank by tank.

When such activated sludge process bed is vertically installed above the aeration pipe disposed at the bottom of a treatment tank and air is supplied to the tank, bubbles are produced and blown out entering into the sewage water through a lot of slits formed on the surface of the aeration pipe, and the sewage water containing oxygen of the air dissolved thereinto comes in contact with the activated sludge process bed above the aeration pipe. Thus water pollution materials such as BOD, COD are decomposed by aerobic bacteria and anaerobic bacteria both implanted and cultivated on the activated sludge bed. Meanwhile, these aerobic and anaerobic bacteria are further bred utilizing a part of energy obtained at the time of decomposition. In this regard, in the case of the conventional activated sludge process bed in FIG. 2, there is not communication between the inside and the outside of the cylindrical activated sludge process bed at all, and besides, because of its cylindrical form, the water flows very slowly inside the cylinder as compared with the outside thereof. Accordingly, the sewage water of which DO value has been increased by the aeration largely contacts the outer periphery of the activated sludge process bed, and aerobic bacteria are bred a lot on the outer peripheral surface of the bed. To the contrary, anaerobic bacteria are bred on the inner peripheral surface of the bed since DO value of the sewage water contacting the inner periphery of the bed is lower.

On the other hand, according to the present invention, the outer periphery of the cylindrical core is not completely wrapped with the porous material but partially exposed. And as the periphery of the cylindrical core is formed either mesh-like or grid-like, sewage water with its DO value increased through the exposed portions is circulated between the inside and the outside of the activated sludge bed. Thus when enlarging the exposed area of the outer periphery of the cylindrical core and increasing the amount of air supplied to the treatment tank, aerobic bacteria are supposed to be increased both inside and outside of the activated sludge process bed. As the aerobic bacteria exhibit excellent performance particularly in the treatment of BOD, etc. of high density, it is possible to get a treatment tank suitable for the treatment of high BOD by the above-described arrangement. Furthermore, when reducing the exposed area as well as air supply to the tank, DO value is lowered as much and in particular DO value inside the cylindrical bed is considerably lowered. Accordingly, it is possible to give variety to kind of bacteria composing the activated sludge, distribution thereof, etc., in such manner that breeding rate of aerobic bacteria becomes dull while that of anaerobic bacteria sharp. Since anaerobic bacteria exhibit excellent performance particularly in the treatment of BOD being at lower level as well as in the decomposition of nitrogen, it is possible to arrange a specified treatment tank suitable for the treatment of low BOD, etc. using anaerobic bacteria which follows the preceding treatment by aerobic bacteria. Accordingly, it is preferred that a plurality of treatment tanks are installed in a row, one tank being communicated with the other tank adjacent thereto through a channel and having a plurality of activated sludge beds disposed, and in each tank of which exposed area of the outer periphery of the cylindrical core of the bed is reduced bed by bed as well as the reduction of air supply from the aeration pipe to each tank. By such arrangement it becomes possible to exhibit treatment performance of each bed at its maximum according to the process of the treatment, and as a result a stable and high sewage treatment performance as a whole is insured over a long period of time.

In addition, it is to be noted that giant micro-organisms, such as Zoogloea bacteria, Sphaerotilus, Nematoda or water mite are spontaneously bred or come to live at the center portion of the porous member of the activated sludge process bed and eat away both aerobic and anaerobic bacteria to autolyze them. Therefore, excessive increase of aerobic bacteria and generation of sludges is successfully prevented.

Since the above-described functions are exhibited in accordance with the present invention, when applying several activated sludge process beds selected appropriately to each of the treatment tanks installed in a row, the most appropriate breeding layers for respective treatment process can be stably formed in the beds in each tank. As a result, even when the amount of air supply from the aeration pipe is kept as it was set at the starting of operation, a quite efficient sewage treatment is performed by the treatment equipment as a whole in spite of variation in BOD and COD in sewage water, and it is possible to treat sewage water always at high efficiency. Besides, the day-to-day operation control is easy and it does not require much labor.

BRIEF DESCRIPTION OF THE DRAWINGS

Other objects and features of the present invention will become apparent in the course of the following description in conjunction with the accompanying drawings wherein:

FIG. 2 is a perspective view of an activated sludge process bed conventionally used; and FIG. 3 is a partially cutout enlarged perspective view of FIG. 2.

DESCRIPTION OF THE PREFERRED EMBODIMENT

Figure 1:
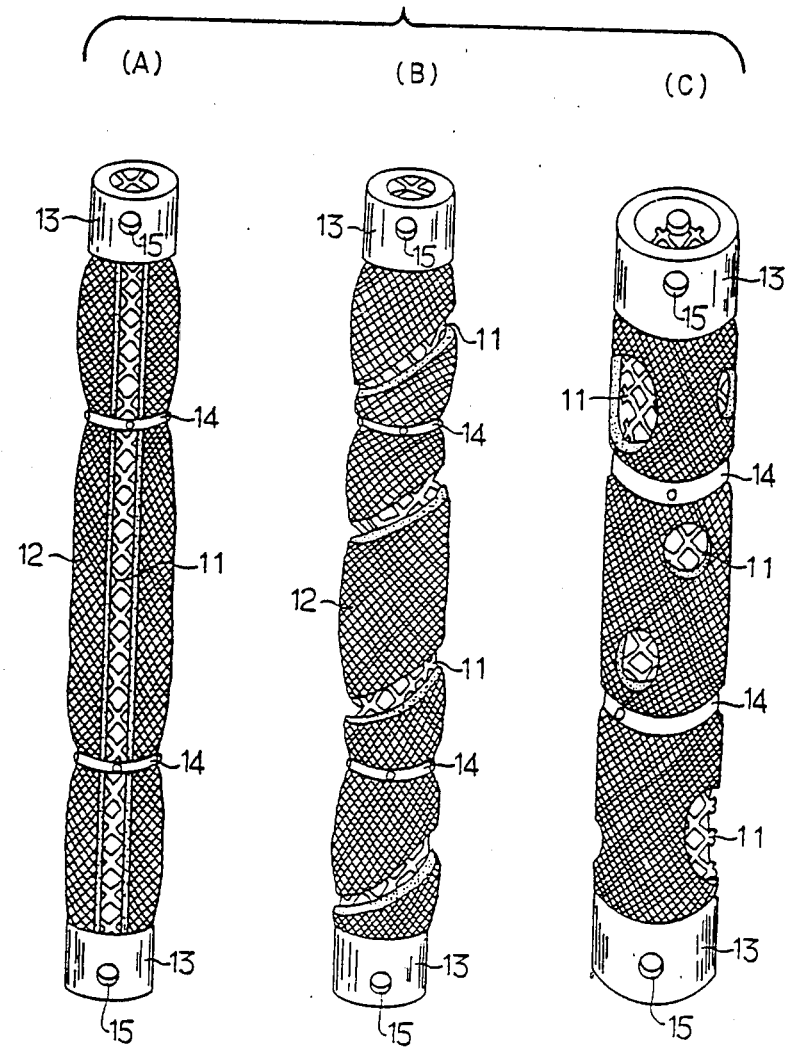
FIG. 1 show perspective views of various activated sludge process beds embodied according to the present invention.

Referring now to the accompanying drawings, a preferred embodiment of the present invention is described hereinafter.

As seen in FIG. 1 showing a perspective view of an activated sludge process bed according to the present invention, members composing the activated sludge process bed are quite the same as known sludge process bed described above with reference to FIGS. 2 and 3. The activated sludge process bed according to the present invention, however, is different from the known beds in that an outer periphery of a cylindrical core 11 is not completely coated with a porous member 12 but partially exposed. That is, in the activated sludge process bed shown in FIG. 1 (A), the porous member 12 is partially cut out longitudinally by about one third (⅓) of the outer periphery thereof and the cylindrical core 11 is exposed as much. Then in the case of an activated sludge process bed shown in FIG. 1 (B), the porous member 12 is cut out at a certain width in the form of a spiral and the cylindrical core 11 is partially exposed. In the case of an activated sludge process bed shown in FIG. 1 (C), the porous member 12 is cut out irregularly at plural portions in the form of circles scattered or the like and the cylindrical core 11 is exposed thereby. In each of these activated sludge process beds, an area where the cylindrical core 11 is exposed by partially cutting out the porous member 12 is reduced tank by tank in order of (A), (B) and (C). In other words, a covered area of outer periphery of the cylinder with the porous member 12 becomes larger bed by bed in order.

The activated sludge process beds arranged as above can be operated in the following manner, for example.

First, a plurality of treatment tanks, e.g., four tanks forming a first tank to fourth tank, are installed with their channels (passages) communicated each other in order. Then, the activated sludge process bed shown in FIG. (A) is vertically disposed in the first tank, the bed in FIG. 1 (B) in the second tank, the bed in FIG. 1 (C) in the third tank, and the known bed in FIG. 2 in the fourth tank. In a sewage treatment equipment arranged in this way, sewage water is brought into a flow control tank through a sewage water in-flow pipe and after overflowing therefrom, enters into the first tank and receives strong aeration from an aeration pipe to increase DO value thereof, the water being circulated by a pump or the like (not shown) at the same time. In this process, aerobic bacteria are implanted and cultivated in vacant space portions on the outer periphery of the activated sludge process bed of FIG. 1 (A), while the sewage water of which DO value is increased flows into the interior part of the cylinder through the exposed portions of the cylindrical core 11, and as a result aerobic bacteria are implanted and cultivated also in vacant space portions of the inner periphery of the cylinder. This aerobic bacteria oxidatively decompose water pollution materials such as BOD, COD, etc. contained in the sewage water, and breed themselves utilizing a part of energy obtained at the time of decomposition. In the meantime, giant micro-organisms such as Zoogloea bacteria, Sphaerotilus, Nematoda or water mites are spontaneously bred or come to live at the center portion of the bed and eat away excess aerobic and anaerobic bacteria to autolyze them. In this way, in the bed, a thickness of a film formed of aerobic and anaerobic bacteria is substantially kept constant, and sewage water is treated without producing excessive sludges. In addition, at the foregoing process, since the giant micro-organisms eat away the aerobic and anaerobic bacteria starting from the center portion toward the outer surface of the porous member 12, aged and used bacteria of which decomposition performance is declined are eliminated in order, and accordingly fresh and active aerobic and anaerobic bacteria are always cultivated and bred on both outer and inner surfaces of the cylinder, improving the treatment performance thereby.

The sewage water treated in the first tank as above described is then flown into the second tank, where almost the same treatment as in the first tank is applied to the water. After being further treated in the third and fourth tanks in the same manner, the finally treated water is discharged from the fourth tank by way of a discharging pipe.

In the treatment process mentioned above, the amount of air supply from each aeration pipe to each tank is reduced or throttled tank by tank in order so that DO value in each tank is variably controlled. In addition, since the shape and area of the exposed portions of each cylindrical core 11 are different tank by tank, DO value varies further between the outside and the inside of each activated sludge bed. Thus, there is a variation tank by tank in the aspects of kind of bacteria, ratio between the aerobic and anaerobic bacteria, distribution of giant micro-organisms, etc. cultivated in each bed disposed in the first to fourth tanks according to the variation of DO value inside and outside of each bed. The ratio of aerobic bacteria to anaerobic bacteria is, for example, 80% to 20% in the case of the activated sludge bed of FIG. 1 (A) disposed in the first tank, 60% to 40% in the case of the bed of FIG. 1 (B) disposed in the second tank, 50% to 50% in the case of the bed of FIG. 1 (C) disposed in the third tank, and 40% to 60% in the case of the bed of FIG. 2 disposed in the fourth tank. In this way, high BOD in the sewage water is mainly treated in the first tank, residual BOD and COD in the second tank, still residual BOD, COD and nitrogen etc. in the third tank, and further remaining low BOD, COD are mainly treated in the fourth tank together with the elimination of nitrogen.

The scope of the present invention is not limited to the embodiment described above and shown in the drawings but includes several modifications. For example, the number of treatment tanks is not always restricted to four but can be any other number not less than two. Shape and disposition of each tank is not restricted to those illustrated, either, but can be circular, for example. Furthermore, as for the shape of the activated sludge process bed, it can be polygonal in section other than circular so far as the bed is tubular. It is also preferred that the exposed portions of the cylindrical core formed by cutting out the porous member or by partially wrapping the core with the porous member in the case of the above embodiment, are formed into any other shape than illustrated ones so far as the exposed portions vary tank by tank in order.

Further modifications will be possible in the method of fitting porous member to the cylindrical core or disposing vertically the activated sludge process beds in the tanks.

What is claimed is:

1. In an activated sludge process bed in which a mesh-like or grid-like outer periphery of a cylindrical core composed of a hard synthetic resin resistant to corrosion over a long period of immersion in sewage water, said cylindrical core being wrapped with a porous member formed of a corrosion resistant synthetic resin, said core being tightened by tightening means, the improvement comprising: the outer periphery of the cylindrical core is not completely wrapped with the porous member but is partially exposed in a specified form, thereby ensuring communication between the inside and outside of the activated sludge process bed, said specified form being within a group consisting of a structure wherein (A) no more than one-third of an outer periphery of the cylinder is longitudinally exposed, (B) a certain width of the outer periphery of the cylindrical core is spirally exposed and (C) plural portions of the porous member are irregularly cut out so that exposed portions of the outer periphery of the cylindrical core are scattered.

2. An activated sludge process bed as claimed in claim 1, wherein the porous member is composed of a lot of polyvinylidene chloride yarns intertwisted with one another.

* * * * *